(12) United States Patent
Vertanen et al.

(10) Patent No.: US 6,820,637 B1
(45) Date of Patent: Nov. 23, 2004

(54) TEMPERATURE CONTROL CHECK VALVE FOR WATER HEATER

(76) Inventors: Mark W. Vertanen, 789/4 M00 1 Nongkhor-Laemchabang Road, Tambol Nongkham, Sriracha, ChonBuri, 20280 (TH); Peter (Veli Pekka) Huopalainen, 10247 127th Street, Surrey, BC (CA), V3V5J8

(*) Notice: Subject to any disclaimer, the term of this patent is extended or adjusted under 35 U.S.C. 154(b) by 0 days.

(21) Appl. No.: 10/196,040

(22) Filed: Jul. 16, 2002

(51) Int. Cl.[7] .............................................. A01M 7/00
(52) U.S. Cl. ................... 137/340; 137/351; 236/99 K; 222/146.2; 165/51
(58) Field of Search ................................. 137/351, 340; 236/92 C, 99 K; 222/146.1, 146.2; 165/51

(56) References Cited

U.S. PATENT DOCUMENTS

| | | | | |
|---|---|---|---|---|
| 2,400,615 A | * | 5/1946 | Warrick et al. | ........... 236/99 K |
| 2,400,911 A | * | 5/1946 | Booth | ....................... 236/99 K |
| 3,521,704 A | * | 7/1970 | Bridegum | .................... 165/70 |
| 4,140,150 A | * | 2/1979 | Rundell | ....................... 137/340 |
| 4,338,891 A | * | 7/1982 | Blitz | ......................... 123/41.31 |
| 4,488,680 A | * | 12/1984 | Itoh | ............................ 236/93 A |
| 4,978,060 A | * | 12/1990 | Stahly | ......................... 236/34.5 |
| 5,497,918 A | * | 3/1996 | Brilanchik | ................ 222/146.1 |

* cited by examiner

Primary Examiner—A. Michael Chambers
(74) Attorney, Agent, or Firm—McKee, Voorhees & Sease, P.L.C.

(57) ABSTRACT

An improved water heater is proved, particularly for marine use, wherein a heated liquid, such as engine coolant, flows to a heat exchanger in a water tank to heat the water therein. The improvement comprises a check valve assembly in the engine coolant line to control the flow of coolant to the heat exchanger, and thereby control the temperature of the water. As the water temperature increases, the check valve moves towards a closed position to reduce and ultimately stop the flow of heated engine coolant to the heat exchanger. As the water temperature decreases, the poppet valve moves toward and open position, so as to increase the flow of engine coolant to the heat exchanger, and thereby further heat the water. The water temperature is sensed by a wax actuator within the check valve which expands in response to increased water temperatures and contracts in response to decreased water temperatures.

14 Claims, 3 Drawing Sheets

TEMPERATURE CONTROL CHECK VALVE FOR WATER HEATER

BACKGROUND OF THE INVENTION

Marine water storage systems typically use small tanks ranging from 5 to 20 gallons. The water in the tanks is heated to provided hot water on the ship or boat. When the ship is docked, the water normally is heated using a 110 or 220 volt electric heater. The electric heater includes low temperature and high temperature thermostats which turn the electric heater on and off, as required, to keep the water in the storage tank in a desired temperature range, normally 140–190° F. When the ship is away from shore and shore power is not available, engine coolant from the engine is plumbed to the water storage tank and cycled through a heat exchanger so as to heat the water in the tank. The engine coolant can heat the water to a temperature equal to the engine operating temperature. Due to the small tank volume, it is common for the water temperature to reach 200° F., or higher, with large diesel engines operating at temperatures of approximately 225° F. Thus, very hot water of at least 200° F. may be provided from the tank to the ship's faucets and showers. Such hot water is a safety hazard.

Accordingly, a primary objective of the present invention is the provision of an improved marine water heater.

A further objective of the present invention is the provision of a marine water heater having a temperature control check valve to regulate the temperature of water in the tank.

Another objective of the present invention is the provision of a method for controlling the water temperature of a marine water heater.

Still another objective of the present invention is the provision of a method for controlling the flow of engine coolant to a marine water heater.

Yet another objective of the present invention is the provision of a check valve for controlling the flow of engine coolant to a marine water heater to control the temperature of the water in the storage tank.

A further objective of the present invention is the provision of a temperature control check valve for a marine water heater which is economical to manufacture, easy to install, and effective in use.

These and other objectives will become apparent from the following description of the invention.

BRIEF SUMMARY OF THE INVENTION

The improved marine water heater of the present invention includes a water tank, a heat exchanger in the tank to heat the water in the tank, and a fluid line to supply engine coolant from an engine to the heat exchanger. A check valve is provided in the fluid line to regulate the water temperature. The check valve is moveable between open and closed positions to increase and decrease the flow engine coolant through the line, as the water temperature decreases and increases, respectively. The check valve includes a wax actuator which is in fluid communication with water in the tank. As the water temperature increases, the actuator expands to move the check valve toward the closed position. When the water temperature decreases, the actuator contracts to move the check valve toward the open position.

In the method of the present invention, the water temperature of the water heater is controlled by installing a check valve in the fluid line between a heat source and a heat exchanger in the tank. The method further includes the steps of exposing the check valve to water from the tank, and moving the check valve toward a closed position in response to increasing water temperatures and moving the check valve toward an open position in response to decreasing water temperatures. As the check valve moves between the open and closed position, the temperature of the water is regulated so as to remain within a safe range.

DETAILED DESCRIPTION OF THE INVENTION

Figure 1:
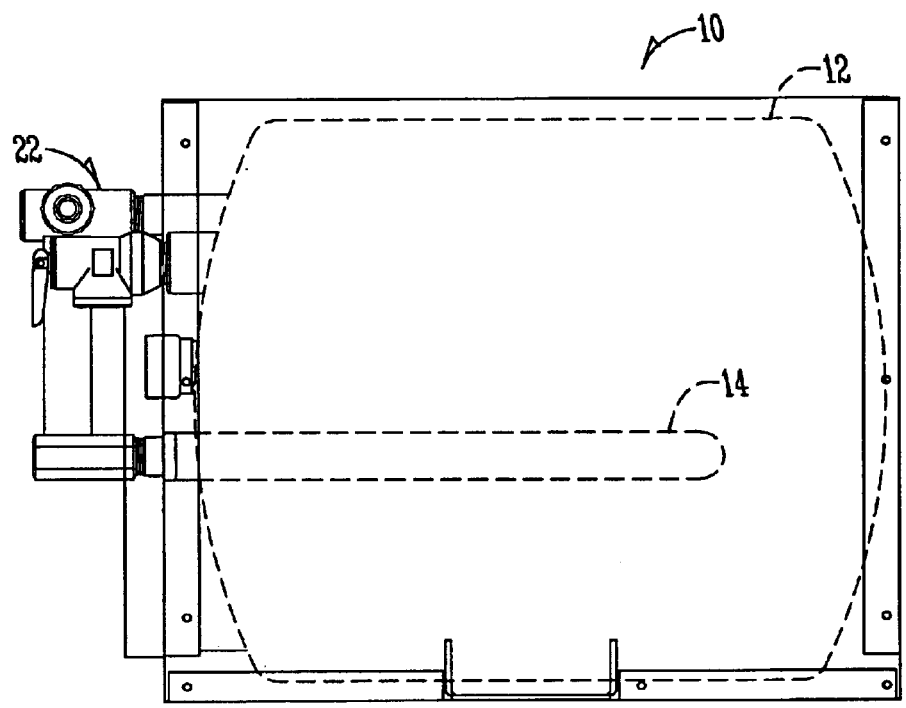
FIG. 1 is a side elevation view of a water heater using the check valve of the present invention.
Figure 2:
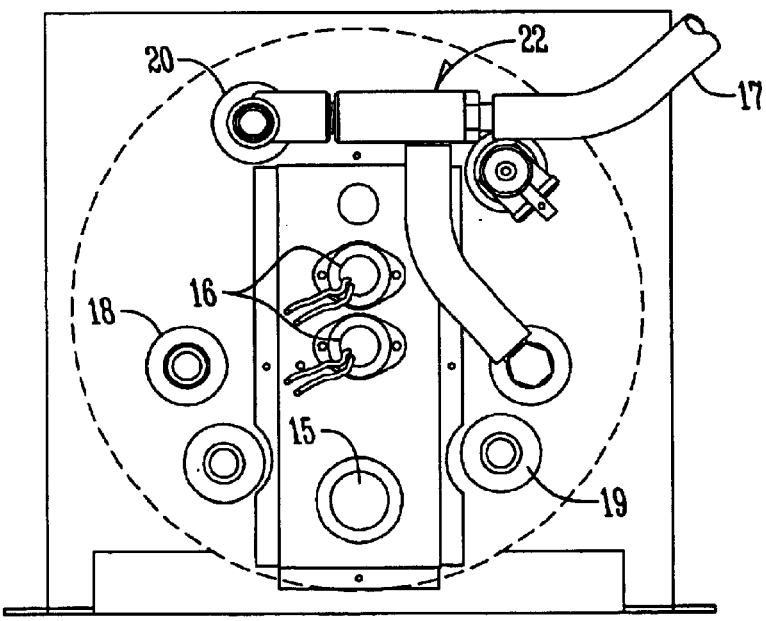
FIG. 2 is an end view of the water heater with the check valve.

In the drawings, a marine water heater is generally designated by the reference numeral 10. The water heater 10 includes a water tank 12 with a heat exchanger 14 therein. The water heater 10 include an electrical connection 15 adapted to be plugged into an electric power source so that the heater 10 can be operable from electrical shore power when a ship or boat is docked. Thermostats 16 are provided on the heater 10 to control the operation of the electric heater. The heater 10 also includes an inlet line 17 adapted to be connected to an engine cooling system, and an outlet line 18 to return fluid to the engine cooling system. A cold water inlet 19 provides water to the tank 12 and a hot water outlet 20 conveys hot water out of the tank 12.

The above described structure for the water heater 10 is conventional and does not constitute a part of the present invention.

The present invention is directed towards a check valve assembly 22 disposed between the engine coolant inlet line 17 and the heat exchanger 14. The check valve assembly 22 controls the flow of engine coolant to the heat exchanger 14.

More particularly, the check valve assembly 22 includes a body 24 having a longitudinal bore 26 extending therethrough. The body 24 has a threaded first end 28 to which a hose fitting 30 is threadably coupled. The engine coolant inlet line 17 is connected to the hose fitting 30. An O-ring 31 provides a seal between the body 24 and the fitting 30.

The body 24 has an opposite threaded second end 32, to which is threadably coupled a hot water fitting 34. The fitting 34 has a hot water inlet 36 and a hot water outlet 38 which is plumbed to the ship's water system.

Figure 3:
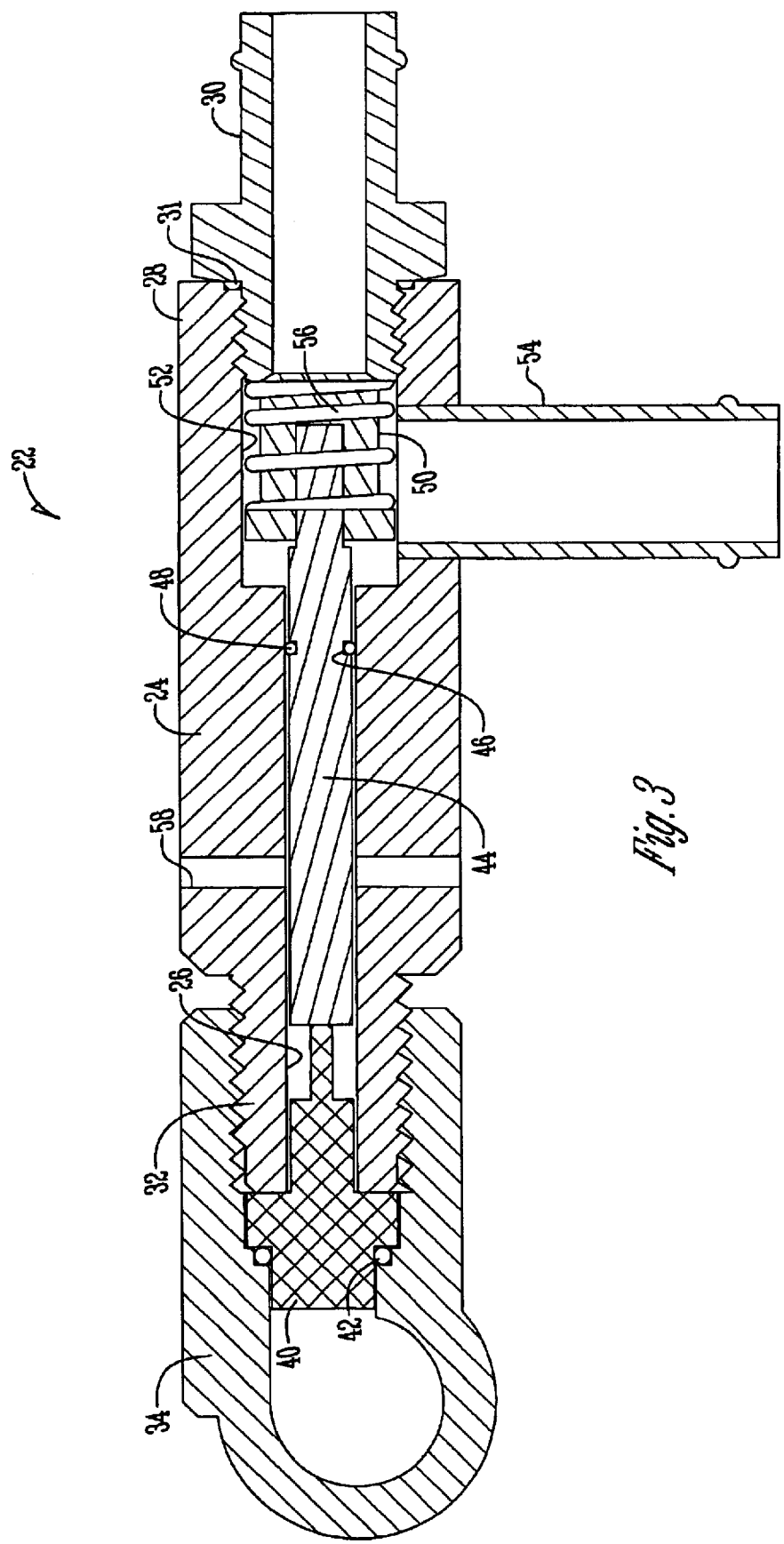
FIG. 3 is a sectional view of the check valve assembly.
Figure 4:
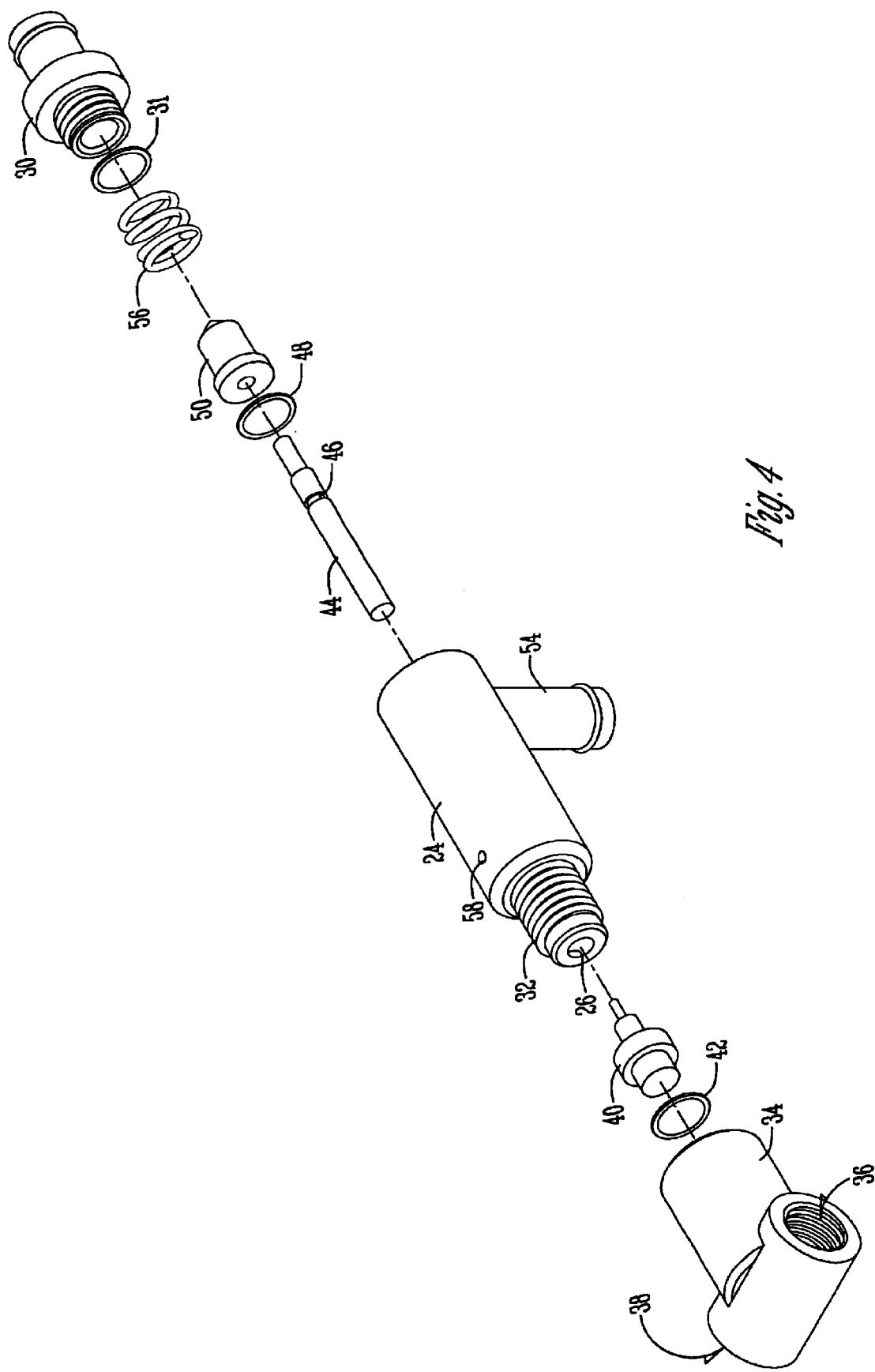
FIG. 4 is an exploded perspective view of the components of the check valve assembly.

The hot water passing through the fitting 34 contacts a wax actuator 40 which expands as the water temperature increases and contracts as the water temperature decreases. An O-ring seal 42 resides between the actuator 40 and the hot water fitting 34. The actuator 40 has a portion extending into the bore 26 of the body 24 for engagement with an actuator rod 44 slidably mounted in the bore 26. The rod includes an annular groove 46 to receive an O-ring seal 48 which sealingly engages the sidewall of the bore 26, as best seen in FIG. 3.

A poppet valve 50 is mounted on the end of the actuator rod 44. The valve 50 is slidably mounted in an enlarged bore section 52 of the body 24 between open and closed positions. In the closed position, the poppet valve 50 is in sealing engagement with the inner end of the engine coolant hose fitting 30, such that engine coolant liquid cannot flow into the body 24. In the open position, the poppet valve 50 is disengaged from the engine coolant fitting 30 such that coolant liquid can flow into the enlarged bore section 52 of the body 24. A coolant outlet fitting 54 extends from the body 24 of the check valve assembly 22, and is in fluid communication with the enlarged bore section 52. Thus, when the poppet valve 50 is open, hot engine coolant flows through the inlet fitting 30, through the enlarged bore section 52, and out the outlet fitting 54 for introduction into the heat exchanger 14, so as to heat the water in the tank 12. When the poppet valve 50 is closed, the engine coolant cannot flow to the heat exchanger 14, such that the water in the tank 12 will cool.

The check valve 22 thus controls the flow of engine coolant for heating the water in the tank 12. The movement of the poppet valve 50 between the open and closed positions is a function of the water temperature. The water temperature is sensed by the wax actuator 40 as the water flows through the fitting 34. As the water temperature increases, the wax actuator 40 expands to push the actuator rod 44 and the poppet valve 50 toward the closed position. When the water reaches a predetermined temperature, preferably in the range of 190° F., the poppet valve 50 will be in the closed position, so that the flow of engine coolant to the heat exchanger 14 is stopped, such that the water will not be further heated. As the water temperature decreases, the wax actuator 40 contracts, thereby allowing the spring 56 to bias the poppet valve 50 and actuator rod 44 toward the open position, thereby allowing hot engine coolant to flow to the heat exchanger 14 and thereby heat the water.

A vent opening 58 is provided in the body 24 of the check valve assembly 22 to discharge engine coolant, in the event that there is a leak past the O-ring 48. The vent opening 58 precludes engine coolant from mixing with the potable water flowing through the water fitting 34.

According to the method of the present invention, the flow of hot engine coolant to the heat exchanger of the marine water heater is controlled by exposing the check valve 22 to water from the tank 12. The poppet valve 50 of the check valve assembly 22 is moved toward the closed position in response to increasing water temperatures, so as to reduce the flow of engine coolant to the heat exchanger 14. The poppet valve 50 of the check valve assembly 22 is moved toward the open position in response to decreasing water temperature so as to increase the flow of engine coolant to the heat exchanger. Thus, the present invention provides a method for controlling the water temperature in the water heater tank by sensing the temperature of the water and then automatically increasing or decreasing the flow of heated liquid to a heat exchanger in the tank when the water temperature decreases or increases, respectively. The movement of the poppet valve 50 within the check valve assembly 22 provides the automatic increase or decrease in the flow of heated liquid, and thus automatically regulates the water temperature so as to be within a safe range.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A check valve for controlling the flow of engine coolant supplied to a marine water heater, the heater including a water tank and a heat exchanger in the tank, the check valve comprising:

a body having opposite first and second ends and a longitudinal bore;

a hot water fining on the first end of the body adapted to supply water from the tank to the body;

an engine coolant fitting on the second end of the body adapted to supply engine coolant to the body;

an engine coolant outlet in the body adapted to supply engine coolant to the heat exchanger so as to heat water in the tank;

a valve mounted within the body and being movable between a closed position closing the engine coolant fitting and an open position opening the engine cooling fitting; and a actuator in contact with the water flowing through the hot water fitting, the actuator expanding in response to increasing water temperatures such that the valve moves toward the closed position and adapted to contract in response to decreasing water temperatures such that the valve moves toward the open position.

2. The check valve of claim 1 wherein the valve is normally biased to the open position.

3. The check valve of claim 1 further comprising a spring in the body to normally bias the valve to the open position.

4. The check valve of claim 1 further comprising an actuator rod extending between the actuator and the valve.

5. The check valve of claim 4 further comprising a seal between the actuator rod and the body to prevent engine coolant from passing through the bore of the body.

6. The check valve of claim 1 further comprising a seal between the actuator and the hot water fitting to prevent water from entering the bore of the body.

7. The check valve of claim 1 wherein the actuator is wax.

8. The check valve of claim 1 wherein the body includes a vent opening to expel leaking engine coolant without the leaking engine coolant with the water in the tank.

9. The check valve of claim 1 wherein the actuator expands and contracts longitudinally within the bore.

10. The check valve of claim 9 wherein the valve moves longitudinally within the body between the open and closed positions.

11. A method for controlling the flow of engine coolant to a marine water heater having a water tank and a heat exchanger in the tank the method comprising:

installing a check valve in an engine coolant fluid line between an engine coolant source and the heat exchanger;

exposing the check valve to water from the tank;

moving the check valve toward a closed position in response to increasing water temperatures so as to reduce the flow of engine coolant to the heat exchanger; and moving the check valve toward an open position in response to decreasing water temperature so as to increase the flow of engine coolant to the heat exchanger.

12. The method of claim 11 further comprising biasing the check valve toward the open position.

13. The method of claim 11 wherein the movement of the check valve is controlled by an actuator which expands and contracts in response to increasing and decreasing water temperatures, respectively.

14. The method of claim 11 further comprising venting any leaking engine coolant to atmosphere to preclude the leaking coolant from mixing with the water in the tank.

* * * * *

UNITED STATES PATENT AND TRADEMARK OFFICE
CERTIFICATE OF CORRECTION

PATENT NO. : 6,820,637 B1
DATED : November 23, 2004
INVENTOR(S) : Vertanen et al.

It is certified that error appears in the above-identified patent and that said Letters Patent is hereby corrected as shown below:

<u>Column 4,</u>
Line 3, should read -- a hot water fitting on the first end of the body adapted to --.
Line 36, should read -- leaking engine coolant mixing with the water in the tank. --.

Signed and Sealed this

Twelfth Day of April, 2005

JON W. DUDAS
*Director of the United States Patent and Trademark Office*